Oct. 22, 1968  A. H. L. WONG  3,406,972
EDUCATIONAL GAME EMPLOYING MAGNETIC ATTRACTION
Filed Jan. 19, 1965
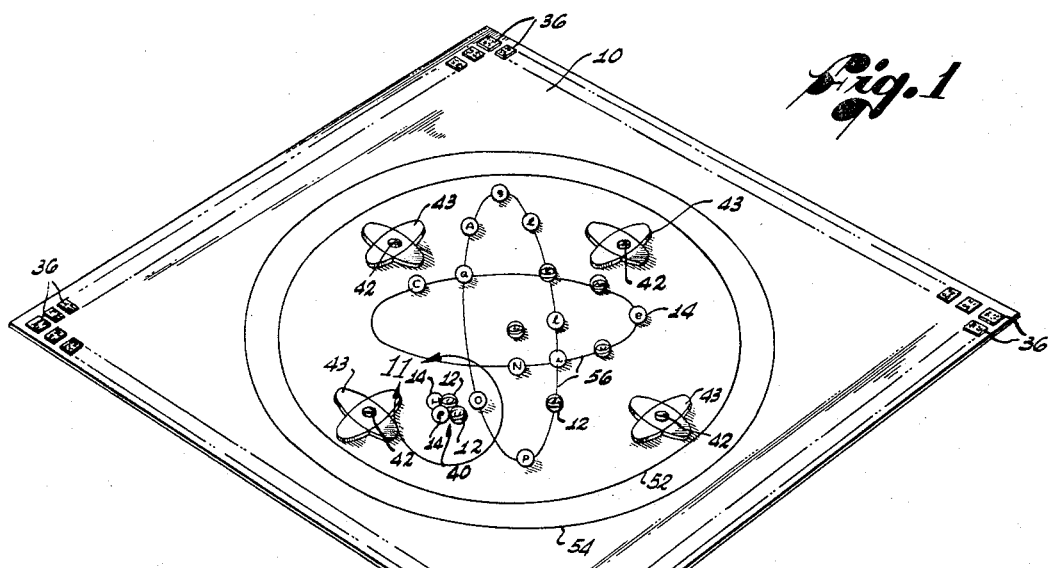
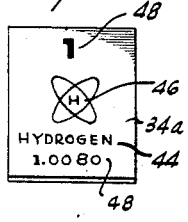
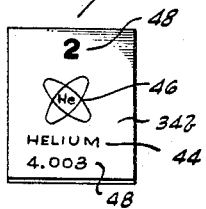
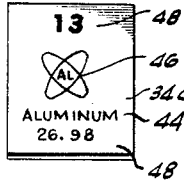
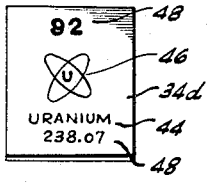
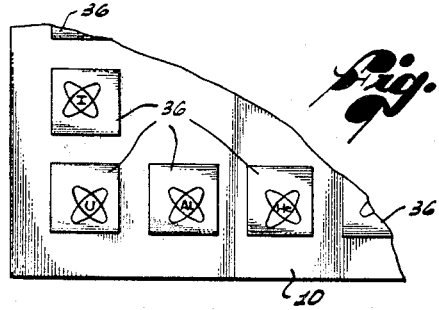
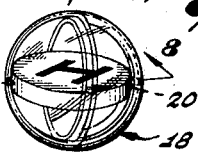
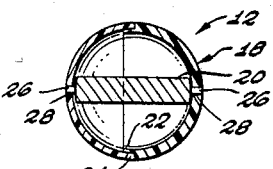
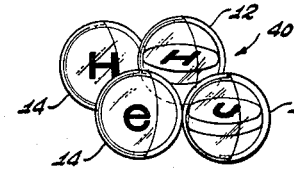
INVENTOR.
ALBERT H. L. WONG
BY Fulwider, Patton, Rieber,
Lee, and Utecht
ATTORNEYS

United States Patent Office 3,406,972
Patented Oct. 22, 1968

3,406,972
EDUCATIONAL GAME EMPLOYING MAGNETIC ATTRACTION
Albert H. L. Wong, 3537 Chesapeake Ave.,
Los Angeles, Calif. 90016
Filed Jan. 19, 1965, Ser. No. 426,548
11 Claims. (Cl. 273—118)

This invention relates to educational and amusement devices and, more particularly, to an educational game.

In developing most basic mental skills, the degree of effort devoted is an extremely important factor. If an inducement can be provided to maintain a person's interest, particularly that of a child, the learning process is greatly enhanced. One highly effective inducement is to make the process enjoyable.

In line with this theory, many educational devices and methods have evolved. Typical of these are the educational toys and games now on the market.

Considering specifically educational games, there is one further factor to be borne in mind. Games which not only require the exercise of mental skill, but also the exercise of physical skill generally tend to be more effective in accomplishing the desired educational objective. They tend to be played more often and for longer time periods than those games which require only the exercise of mental skill.

In view of the foregoing, it is an object of the invention to provide an educational game which is enjoyable to play and which is highly effective in teaching mental skills.

It is another object to provide an improved educational game, the play of which requires the exercise of both mental and physical skills.

A further object is to provide a game of the type described which readily lends itself to adaptation to teaching a variety of different mental skills.

A related object is to provide a game capable of being adapted for teaching mental skills applicable to a wide range of age groups.

Still another object is to provide a game of the type described in which the physical skill exercised is much like that exercised in the play of the favorite American game of marbles.

The game of the invention embodies several groups of movable playing pieces. These include magnetic pieces, magnetically attractable pieces and nonmagnetic pieces. At least certain of the pieces have indicia on them related to the educational object of the game. In playing the game, one group of pieces as, for example, the nonmagnetic ones, are projected or shot to knock pieces from the other groups into one another or at least into close proximity to one another to cause them to be drawn together to form magnetically held clusters. The goal is to obtain the highest possible score by forming large clusters of selected ones of the pieces with the desired indicia on them. The score is determined with the aid of means such as a series of cards having indicia on them corresponding to that on individual pieces or combinations thereof and other related information.

It will become apparent as the details of the game are set forth that the principle may be adapted to teaching a variety of different mental skills. For sake of clarity, one embodiment is described in considerable detail, this being adapted for the field of chemistry to the teaching of the elements of the periodic table, their symbols and their atomic numbers and weights. However, it is to be understood that this is intended in no way to be limitative.

These and other objects, features and advantages of the invention will be better understood by referring to the following detailed description taken in conjunction with the accompanying drawing in which:

FIGURE 1 is a perspective view of the game board constructed in accordance with the invention and having certain of the movable playing pieces arranged as at the start of the game and others formed in a cluster as after limited play has taken place;

FIGURE 2 is a plan view on an enlarged scale of the corner area of the board circled by the line 2 in FIGURE 1;

FIGURES 3 to 6 are plan views of exemplary cards of the type which may be used to aid in scoring play;

FIGURE 7 is a perspective view of an illustrative magnetic playing piece;

FIGURE 8 is a sectional view taken along the line 8—8 of FIGURE 7;

FIGURE 9 is a view partly in diametric section and partly in elevation of a magnetically attractable playing piece;

FIGURE 10 is an elevational view of a nonmagnetic playing piece; and

FIGURE 11 is a perspective view of a cluster formed by magnetic and magnetically attractable playing pieces, such as the cluster formed in the area encircled by the line 11 in FIGURE 1.

Referring to the drawing, and in particular to FIGURE 1, numeral 10 designates the game board of the invention. It comprises generally a flat sheet of nonmagnetic material, such as relatively stiff cardboard or, alternately, a flexible cloth-like material adapted to be laid on a hard, flat surface. The board 10 is suitably marked in accordance with the theme of the game as will be brought out more fully below.

Three groups of different types of movable playing pieces are provided. These include magnetic pieces 12 (FIGURES 7 and 8), magnetically attractable pieces 14 (FIGURE 9), and nonmagnetic pieces 16 (FIGURE 10). Each of the pieces, irrespective of its group, is spherical in external shape and is about the size of a large marble. This has the advantage of enabling the pieces to be projected or shot like marbles and to move freely on the board in the same manner. Also, for sake of uniformity, the pieces of all groups preferably are of the same diameter.

Referring to FIGURES 7 and 8, it may be seen that each of the magnetic pieces 12 includes a thin-walled case 18 mounting internally a permanent magnet 20. For convenience of manufacture, the case 18 is made in semispherical sections adapted to be joined together by any suitable means. In the illustrative case, the sections are provided with annular interlocking flanges 22 and 24 that snap together to afford a tight, detachable connection. The case 18 is formed of a magnetically penetratable material. Certain plastics which, preferably, are transparent have been found to be particularly well suited. Not only do they have the desired physical properties, but they are strong and durable and can be economically formed into the desired shapes.

The magnet 20 is generally disc-shaped and has a maximum diameter slightly smaller than the internal diameter of the assembled case 18. Preferably, in order to insure a close working fit between the magnet and the case, the former has its outer wall surface curved slightly in accordance with curvature of the adjacent wall surface of the case. The desired magnetic retentivity is obtained by forming the magnet 20 of a relatively hard ferromagnetic material. The opposite poles of the magnet 20 are at diametrically opposed positions, as adjacent the trunnions 26 or spaced 90° therefrom.

Mounting of the magnet 20 centrally in the case 18 is achieved with trunnions 26 on the magnet and corresponding sockets 28 on the two case sections. As may be seen in FIGURE 8, the trunnions 26 are formed integrally with the magnet 20 at diametrically opposed positions on its periphery. The sockets 28 journal the trunnions 26 when the case is assembled, so that the magnet 20 is pivotal relative to the case about an axis oriented generally perpendicular to the interface between the two case sections. Because of the pivotal mounting of the magnet 20, it rotates within the case as the latter rolls on the board 10 to cause the piece 12 to move erratically.

Each of the magnetically attractable pieces 14 has a case 30 identical to the case 18 of the magnetic pieces 12. Disposed within the case 30 is suitable magnetically attractable means. Such means here comprises a metal ball 32 of a diameter slightly smaller than the internal diameter of the case 30. Preferably, although not necessarily, the ball 32 is formed in a relatively soft, ferromagnetic material that is easily magnetized but has low magnetic retentivity. The magnetically attractable pieces 14 are therefore attracted by the magnetic pieces 12 when brought into close proximity thereto. Moreover, the flux fields of the magnetic pieces 12 then polarize those attracted pieces, so that the latter will, in turn, attract other magnetically attractable pieces 14.

The non-magnetic pieces 16 comprise balls which are formed of the material which is not appreciably affected by the field of the magnetic pieces 12. Various ceramics and plastics have been found to be suitable.

To attain the educational objective of the game, indicia such as the letters "H" and "e" (FIGURES 7 and 9), which are the individual symbols or portions of the composite symbols for the elements in the periodic table, are provided on at least the magnetic and magnetically attractable pieces 12 and 14. This can be conveniently accomplished by applying the indica to the opposite sides of the magnet 12 of the piece 12, and at diametrically opposed positions on the ball 32 of the piece 14. In such positions, the indicia are readily viewable from the exterior through the transparent cases 18 and 30, yet are protected against marking or scarring.

To aid in the play of the game, and, in particular, in the scoring, a series of cards of which cards 34a–d, illustrated in FIGURES 3 to 6, respectively, are exemplars, may be provided. Such cards have indicia on them corresponding to the indicia on the pieces 12 and 14 and further information relative thereto to aid in scoring. In addition, in some instances it is desirable to provide similar matter on the marginal edge portion of the board 10. Referring to FIGURES 1 and 2, it may be seen that this may be presented in the form of cards 36 imprinted on the board around its entire perimeter in a decorative way.

In one method of play of the game, the magnetic and magnetically attractable pieces 12 and 14 are first arranged on the board 10 at spacing from one another. A player then uses one of the non-magnetic pieces 16 as a shooter, much in the manner of a marble, to knock selected ones of the pieces 12 and 14 into or at least into close proximity to one another to attempt to form magnetically held clusters. Such a cluster is illustrated at 40 in FIGURE 1 and again in FIGURE 11. It will be appreciated that because of the polarity of the magnets 20 of the pieces 12, as well as that of the magnetically attracted pieces 14 after they contact magnetic pieces 12, forming a cluster is not assured merely by bringing pieces into close proximity with one another. Should two like poles be positioned adjacent one another when the pieces move together, they will actually repel one another. In passing, it is noted that this phenomenon does not exist when a single magnetic piece 12 and magnetically attractable piece 14 move toward one another. In that case bonding results if either of the poles of the piece 12 pass in close proximity to the piece 14.

In some instances it may be desirable to provide means on the board to aid the formation of clusters. To this end, disc-shaped magnets 2 secured to thin, flat pads 43 may be provided. Four such pad-magnet assemblies 42, 43 are illustrated in FIGURE 1 in positions they might occupy during play. These assemblies remain stationary as the pieces 12, 14 and 16 move on the board, and the pieces 12 and 14 may cluster about the magnets 42.

Once one or more clusters 40 have been formed, scoring is accomplished by interpreting the indicia on the pieces in the cluster. This may be aided by the series of cards of which cards 34a–d (FIGURES 3 to 6) are exemplars. A player's strategy in selecting which pieces to attempt to knock into the cluster may be aided by the cards 36 imprinted on the marginal edge of the board.

In view of this brief description of the play of the game, it will be appreciated that mental skill is exercised in determining which pieces to attempt to knock into the cluster. By appropriately marking the pieces and providing a scoring system, the player can be encouraged to go through the desired mental process, thereby accomplishing the educational objective. On the other hand, physical skill is involved in shooting the nonmagnetic piece 16 and knocking the other pieces into the clusters. Further, as suggested above, the element of chance is involved by virtue of the polarity of the pieces which may cause them to repel one another and the erratic movement of the magnetic pieces 12.

The game of the invention has been illustrated as adapted for teaching the elements of the periodic table, their symbols and atomic numbers and weights. As is known, the symbols for certain elements comprise single or individual letters, e.g., "H" for hydrogen and "U" for uranium (FIGURES 3 and 6), while the symbols for others are composites of two letters, e.g., "He" for helium and "Al" for aluminum (FIGURES 4 and 5).

Considering now this specific embodiment, the indicia on the magnetic and magnetically attractable pieces 12 and 14 are adapted to be used in forming these elements. This is achieved by placing capital letters on certain of the pieces and small letters on others, as illustrated in FIGURES 1–7, and 9. Sufficient letters are provided to enable a player to form the symbols for at least all of the more important elements. The series of cards, of which cards 34a–d are exemplars, contain the full identity of the element, as at 44; the atomic symbol, as at 46; the atomic number, as at 48; and the atomic weight, as at 50.

The board 10 in this one specific embodiment of the game may also include a pair of concentric circles of which the inner circle 52 defines a central scoring area in which the clusters may be formed to obtain a score and an outer circle 54 delineates the inner boundary of a shooting area. To aid in positioning the pieces at the start of the game, decorative symbols such as the intersecting electron shells 56 may be provided within the scoring area.

Once a cluster is formed, the score may, by way of example, be obtained by adding up the atomic numbers. Referring specifically to the cluster 40 of FIGURE 11, it may be seen that there is formed the symbols for the elements hydrogen, helium and uranium, or, alternately, hydrogen twice and uranium. With the aid of the cards 34a–d, the maximum score for this cluster of 97 is obtained, taking the helium atom rather than two hydrogen atoms. To aid in the strategy of the game, the cards 36 imprinted on the marginal edge of the board 10 display the atomic symbol for the element. These cards contain no additional information and are arranged at random, i.e., out of numerical sequence, as illustrated in FIGURE 2. Accordingly, the player is encouraged to learn the atomic numbers and/or weights of the elements in order to obtain a high score. Various modifications of these cards 36 may, of course, be made, such as providing both atomic symbols and atomic numbers.

While this one embodiment of the game has been illustrated and described with a certain degree of particularity, it will be understood that numerous changes and adaptations for teaching different skills to persons of different age groups may be made without departing from the spirit and scope of the invention and defined by the appended claims.

I claim:
1. An educational game, comprising:
a playing board with a smooth, flat playing surface;
a plurality of magnetic pieces, each of which is adapted to move on said playing surface and includes a permanent magnet formed of a relatively hard ferromagnetic material, said magnetic pieces being laterally drawn together when brought into close proximity with their opposite poles adjacent one another;
a plurality of magnetically attractable pieces, each of which is adapted to move on said playing surface and includes means formed of a relatively soft, ferromagnetic material with low magnetic retentivity, each of said magnetically attractable pieces being laterally attracted by said magnetic pieces when in close proximity thereto and the piece so attracted being magnetized so as to laterally attract other of said pieces, whereby said magnetic and magnetically attractable pieces are cooperable to form a magnetically held random cluster.

2. An educational game, comprising: a playing board with a smooth, flat playing surface;
a plurality of magnetic pieces, each of which is spherical in shape and adapted to roll on said playing surface and includes a permanent magnet formed of a relatively hard ferromagnetic material, said magnetic pieces being drawn together when brought into close proximity with their opposite poles adjacent one another;
a plurality of magnetically attractable pieces, each of which is spherical in shape and adapted to roll on said playing surface and includes means formed of a relatively soft ferromagnetic material with low magnetic retentivity, each of said magnetically attractable pieces being attracted by said magnetic pieces when in close proximity thereto and the piece so attracted being magnetized so as to attract other of said pieces;
and at least one nonmagnetic piece which is spherical in shape and adapted to be projected onto said playing surface to knock said magnetic and magnetically attractable pieces into close proximity with one another, whereby to form a magnetically held cluster.

3. An educational game, comprising:
a playing board with a smooth, flat playing surface;
a plurality of magnetic pieces, each of which is adapted to move on said playing surface and includes a permanent magnet formed of a relatively hard ferromagnetic material, said magnetic pieces being drawn together when brought into close proximity with their opposite poles adjacent one another;
a plurality of magnetically attractable pieces, each of which is adapted to move on said playing surface, said magnetically attractable pieces being attracted by said magnetic pieces when in close proximity thereto, and the piece so attracted being magnetized so as to attract other of said magnetic and magnetically attractable pieces;
at least one nonmagnetic piece adapted to move on said playing surface to knock said magnetic and magnetically attractable pieces into close proximity with one another, whereby to form a magnetically held cluster;
indicia on said magnetic and magnetically attractable pieces;
and means bearing indicia corresponding to that on said pieces and related information to aid in scoring.

4. The subject matter of claim 3 further characterized in that said board is formed of a nonmagnetic material and has symbols delineating a scoring area and initial positions for said magnetic and magnetically attractable pieces.

5. The subject matter of claim 4 including magnetic means positioned on said playing surface about which the formation of such cluster takes place.

6. An educational game, comprising:
a plurality of magnetic pieces, each of which is spherical in shape, has a diameter substantially equal to that of the others, and includes a permanent magnet formed of a relatively hard ferromagnetic material, said magnetic pieces being drawn together when brought into close proximity with one another;
a plurality of magnetically attractable pieces, each of which is spherical in shape and has a diameter substantially equal to that of said magnetic pieces, said magnetically attractable pieces being attracted by said magnetic pieces when in close proximity thereto:
at least one nonmagnetic piece which is spherical in shape and has a diameter substantially equal to that of said magnetic and magnetically attractable pieces, said nonmagnetic piece being adapted to be projected to knock said magnetic and magnetically attractable pieces into close proximity to one another, whereby to form a magnetically held cluster;
indicia on said magnetic and magnetically attractable pieces and viewable from the exterior thereof;
and means bearing indicia corresponding to that on said pieces and related information to aid in scoring.

7. The subject matter of claim 6 further characterized in that said means includes a plurality of cards.

8. The subject matter of claim 7 further including a playing board with a smooth flat playing surface, said board having means with indicia corresponding to that on said pieces and related information to aid the player in determining which of said pieces to attempt to knock into close proximity to one another to form said cluster.

9. An educational game, comprising:
a playing board with a smooth, flat playing surface separated into a central scoring area and a peripheral shooting area;
a plurality of magnetic pieces, each of which is spherical in shape and adapted to roll on said playing surface and includes a permanent magnet, said magnetic pieces being adapted to be initially positioned on said playing surface in said scoring area at spacing from one another with insufficient magnetic attraction between said pieces to cause movement of said pieces relative to one another, and said pieces being magnetically drawn together when brought into close proximity with their opposite poles adjacent one another, said magnetic pieces having indicia related to the educational subject of said game, said indicia being viewable from the exterior of said magnetic pieces;
a nonmagnetic shooting piece adapted to be projected from said shooting area into said scoring area to knock said magnetic pieces into close proximity with one another, whereby to form a magnetically held cluster, said indicia and combinations thereof on the pieces in a so formed cluster being related to the educational object of the game;
and means bearing indicia corresponding to that on said pieces and related information to aid in scoring, the score being established by the indicia and combinations thereof on said pieces forming said cluster.

10. An educational game, comprising:
a playing board with a smooth, flat playing surface separated into a central scoring area and a peripheral shooting area;
a plurality of magnetic pieces, each of which is adapted to move on said playing surface and includes a permanent magnet formed of a relatively hard ferromagnetic material, said magnetic pieces having indicia representative of the symbols and portions of said symbols for the elements of the periodic table, and said magnetic pieces being drawn together when brought into close proximity with their opposite poles adjacent one another;

a plurality of magnetically attractable pieces, each of which is adapted to move on said playing surface, said magnetic pieces having indicia representative of the symbols and portions of said symbols for the elements of the periodic table, and said magnetically attractable pieces being attracted by said magnetic pieces when in close proximity thereto and the piece so attracted being magnetized so as to attract other said magnetic and magnetically attractable pieces;

at least one non-magnetic piece adapted to move on said playing surface to knock said magnetic and magnetically attractable pieces into close proximity with one another, whereby to form a magnetically held cluster, said indicia of said magnetic and magnetically attractable pieces forming individual and composite symbols for the elements of the periodic table; and a series of cards, each of which bears the individual or composite symbol, the full name and the atomic number for a given element.

11. The subject matter of claim 10 including indicia on said playing surface including individual and composite symbols for the elements of the periodic table to aid the player in determining which of said pieces to attempt to knock into close proximity to one another in said cluster to form said individual and composite symbols.

References Cited

UNITED STATES PATENTS

| | | |
|---|---|---|
| 2,492,563 | 12/1949 | Flickinger et al. |
| 2,665,912 | 1/1954 | Juran. |
| 2,665,913 | 1/1954 | Hlavac _____ 46—236 X |
| 3,237,941 | 3/1966 | Vincent _____ 46—241 X |
| 3,249,357 | 5/1966 | Luchsinger _____ _____ 273—1 |
| 2,951,703 | 9/1960 | Arnold _____ 273—137 |
| 2,987,852 | 6/1961 | Koch _____ 46—241 |

RICHARD C. PINKHAM, *Primary Examiner.*

T. ZACK, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,406,972                                  October 22, 1968

Albert H. L. Wong

It is certified that error appears in the above identified patent and that said Letters Patent are hereby corrected as shown below:

Column 7, line 7, "magnetic" should read -- magnetically attractable --.

Signed and sealed this 10th day of March 1970.

(SEAL)
Attest:

Edward M. Fletcher, Jr.                  WILLIAM E. SCHUYLER, JR.

Attesting Officer                             Commissioner of Patents